United States Patent [19]
Mori et al.

[11] Patent Number: 5,072,393
[45] Date of Patent: Dec. 10, 1991

[54] ANTISKID CONTROL SYSTEM

[75] Inventors: Akihiko Mori; Yasuo Naito, both of Himeji, Japan

[73] Assignee: Mitsubishi Denki K.K., Tokyo, Japan

[21] Appl. No.: 518,587

[22] Filed: May 2, 1990

[30] Foreign Application Priority Data

May 24, 1989 [JP] Japan .................................. 1-131815

[51] Int. Cl.$^5$ .............................................. B60K 31/00
[52] U.S. Cl. ................................ 364/426.02; 303/97; 303/100
[58] Field of Search ...................... 364/426.01–426.03; 180/197; 303/97, 99, 100, 105

[56] References Cited

U.S. PATENT DOCUMENTS

| | | | |
|---|---|---|---|
| 4,054,328 | 6/1977 | Leiber et al. | 303/103 |
| 4,583,611 | 4/1986 | Frank et al. | 180/197 |
| 4,779,696 | 10/1988 | Harada et al. | 180/197 |
| 4,825,367 | 4/1989 | Nagaoka et al. | 364/424.05 |
| 4,843,552 | 6/1989 | Inagaki | 364/426.03 |

FOREIGN PATENT DOCUMENTS 61-28541 7/1986 Japan .

Primary Examiner—Thomas G. Black
Attorney, Agent, or Firm—Sughrue, Mion, Zinn Macpeak & Seas

[57] ABSTRACT

An antiskid control system comprises wheel speed detecting means for detecting the speed of at least one wheel of a vehicle; braking force adjusting means for decreasing and increasing a braking force to be applied to the wheel; wheel deceleration detecting means for detecting acceleration/deceleration of the wheel; vehicle speed calculation means for calculating vehicle speed based on the wheel speed; slip ratio calculation means for calculating slip ratio based on the vehicle speed and the wheel speed; vehicle deceleration detecting means for detecting deceleration of the vehicle to output information on the wheel deceleration; decreasing amount calculation means for receiving the information on the vehicle deceleration and the slip ratio, and for outputting a signal indicative of a decrease in the braking force to the braking force adjusting means when detecting a tendency of the wheel to lock wherein the wheel deceleration or the slip ratio exceeds a given value; maximum acceleration detecting means for detecting the maximum acceleration of the wheel based on the information on vehicle deceleration; and increasing amount calculation means for receiving the slip ratio, the information on vehicle deceleration and the information on the maximum acceleration, and for finding a control amount based on the relationship between the information on the maximum acceleration and the information on the vehicle deceleration when the slip ratio reaches a given value or less, thereby to output a signal indicative of an increase in the braking force to the braking force adjusting means.

2 Claims, 5 Drawing Sheets

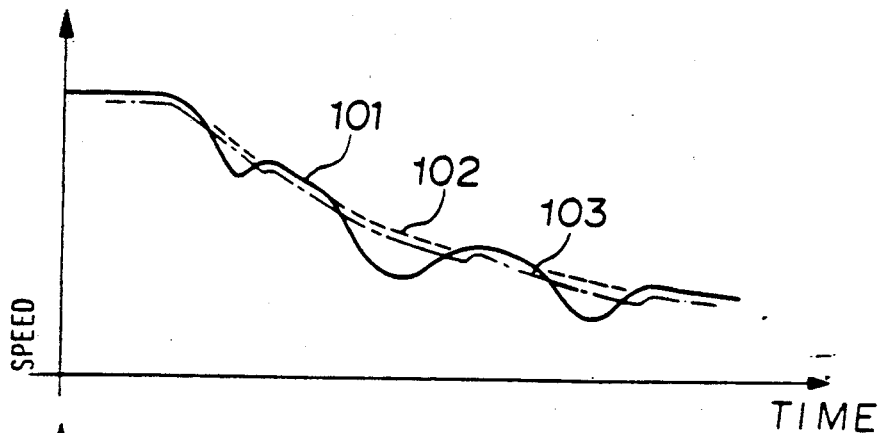
FIG. 4 (a)
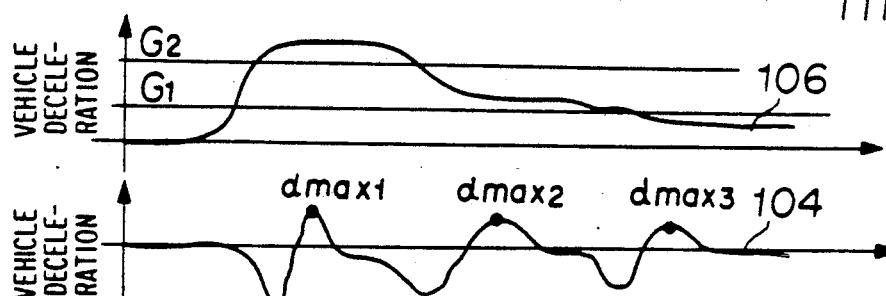
FIG. 4 (b)
FIG. 4 (c)
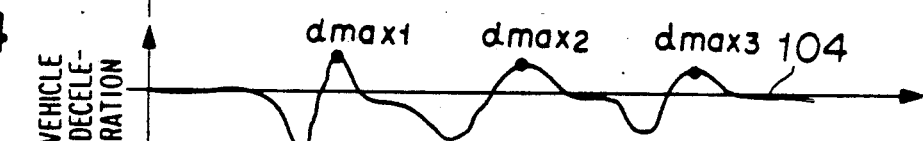
FIG. 4 (d)
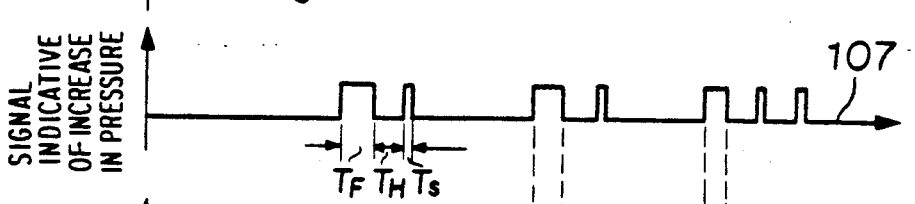
FIG. 4 (e)
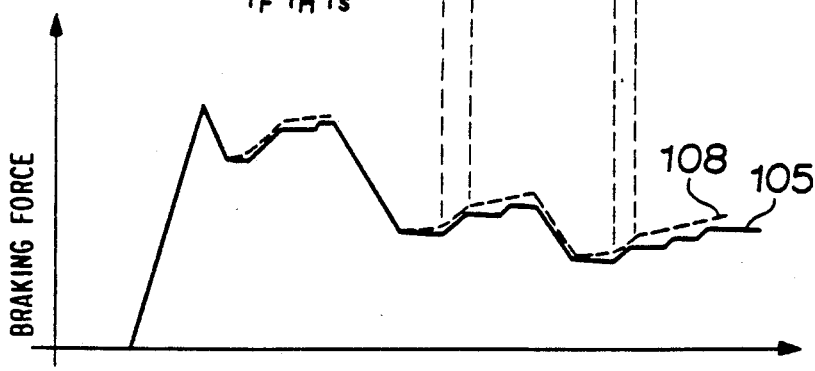

ANTISKID CONTROL SYSTEM

BACKGROUND OF THE INVENTION

FIELD OF THE INVENTION

The present invention relates to an antiskid control system wherein when there is a tendency of a vehicle wheel to lock at the time of braking the vehicle, the action of an actuator causes a brake pressure to decrease, wherein when the revolution of the wheel has been restored due to such pressure reduction, the brake pressure is revived, and wherein these operations are repeated to prevent the wheel from coming into its lock state.

DISCUSSION OF BACKGROUND

FIG. 5 is a drawing to help explain the operation of a conventional antiskid system for a vehicle as disclosed in e.g. Japanese Examined Patent Publication No. 28541/1986. In FIG. 5, reference numeral 101 designates the speed of a wheel. Reference numeral 102 designates an actual speed of a vehicle. Reference numeral 103 designates the speed of the vehicle including the slip ratio of x%. Reference numeral 104 designates deceleration in the wheel speed 101. Reference numeral 105 designates a brake pressure.

In the time period between $t_2$–$t_3$, the brake pressure is decreased because the wheel deceleration 104 exceeds a given value $\alpha 1$, i.e., which means that there is a tendency for the vehicle wheel to lock.

After that, in the time period between $t_5$–$t_6$, the brake pressure is gradually increased since the wheel acceleration is greater than a given value $\alpha 3$, which means that the wheel has been free from the tendency to be locked.

The conventional antiskid brake system carries out such control that the braking force is gradually increased after the braking force has been decreased. This creates problems wherein variation in the brake pressure with respect to the optimum braking force is great, and a control time in the vicinity of the optimum braking force is too short to shorten stopping distance by braking.

SUMMARY OF THE INVENTION

It is an object of the present invention to solve these problems, and to provide a new and improved antiskid control system capable of obtaining an adequate amount of increase in a brake pressure after having decreased a braking force, and of rapidly reviving the braking force in the vicinity of the optimum braking force, allowing the stopping distance by braking to be shortened.

The foregoing and other objects of the present invention have been attained by providing an antiskid control system comprising wheel speed detecting means for detecting the speed of at least one wheel of a vehicle to output information on the wheel speed; braking force adjusting means for decreasing and increasing a braking force to be applied to the wheel; wheel deceleration detecting means for detecting acceleration/deceleration of the wheel speed to output information on the deceleration of the wheel; vehicle speed calculation means for calculating vehicle speed based on the information on the wheel; slip ratio calculation means for calculating slip ratio based on the information on the vehicle speed and the information on the wheel speed to output information on the slip ratio; vehicle deceleration detecting means for detecting deceleration of the vehicle to output information on the vehicle deceleration; decreasing amount calculation means for receiving the information on the wheel deceleration and the information on the slip ratio and for outputting a signal indicative of a decrease in the braking force to the braking force adjusting means when detecting a tendency of the wheel to lock wherein the wheel deceleration or the slip ratio exceeds a given value; maximum acceleration detecting means for detecting the maximum acceleration of the wheel based on the information on vehicle deceleration; and increasing amount calculation means for receiving the information on the slip ratio, the information on vehicle deceleration and the information on the maximum acceleration, and for finding a control amount based on the relationship between the information on the maximum acceleration and the information on the vehicle deceleration when the slip ratio reaches a given value or less, thereby to output a signal indicative of an increase in the braking force to the braking force adjusting means.

The decreasing amount calculation means according to the present invention calculates a required decrease in the braking force based on the information on the wheel deceleration and the information on the slip ratio, and outputs a signal indicative of the decrease to the braking force adjusting means. When the slip ratio reaches the given value or less, the increasing amount calculation means calculates a required increase in the brake pressure based on the information on the vehicle deceleration and the information on the maximum acceleration of the wheel after having decreased the braking force, and outputs a signal indicative of the required increase in the braking force to the braking force adjusting means, thereby allowing the braking force to rapidly reach the vicinity of the optimum braking force.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4(a)–4(e) are graphs showing an operation according to the present invention.

DETAIL DESCRIPTION OF THE PREFERRED EMBODIMENTS

Now, the present invention will be described in detail with reference to a preferred embodiment illustrated in the accompanying drawings.

Figure 1:
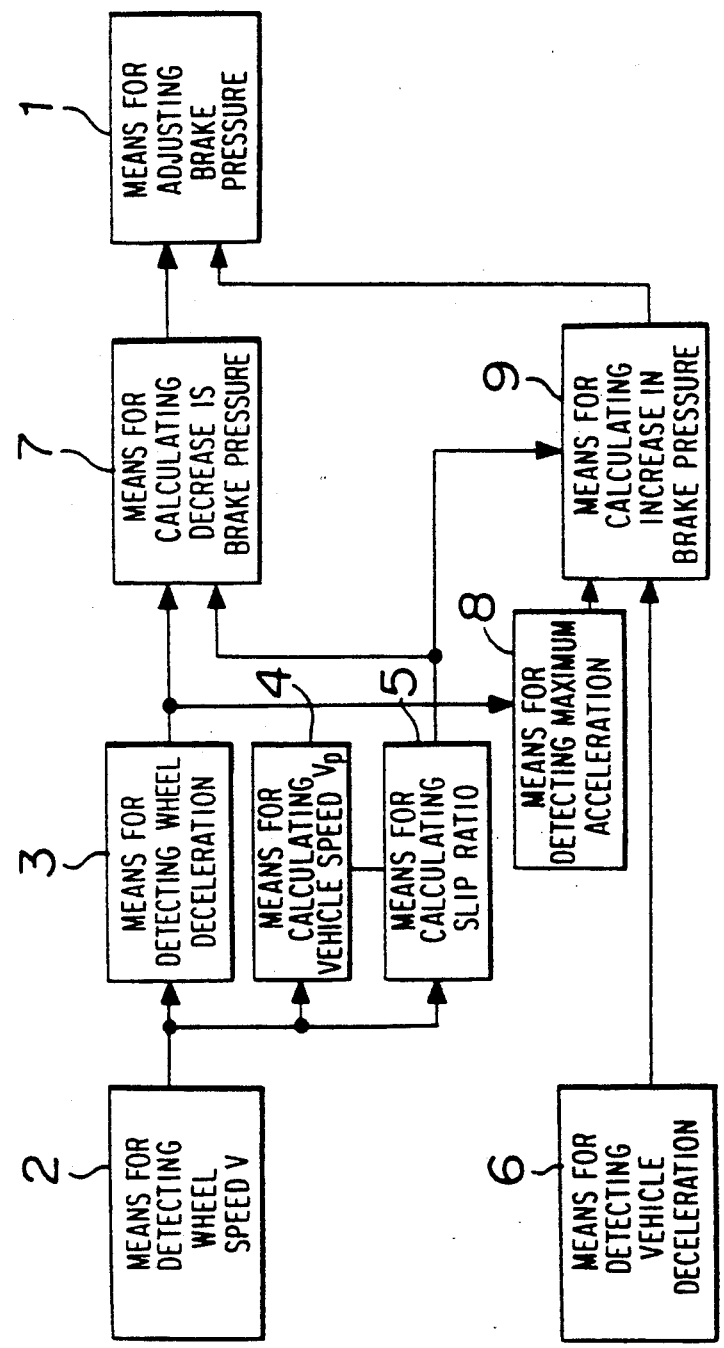
FIG. 1 is a block diagram showing an embodiment of the antiskid control system according to the present invention.

FIG. 1 is a block diagram showing the schematic structure of the embodiment.

In accordance with the embodiment shown in FIG. 1, the antiskid control system comprises braking force adjusting means 1, wheel speed detecting means 2, wheel deceleration detecting means 3, vehicle speed calculation means 4, slip ratio calculation means 5, vehicle deceleration detecting means 6, reducing amount calculation means 7, maximum acceleration detecting means 8, and increasing amount calculation means 9.

The braking force adjusting means 1 is to decrease and increase a braking force to be applied to a wheel of a vehicle. The wheel speed detecting means 2 is to detect the wheel speed of the wheel to output information on the wheel speed. The wheel deceleration detecting means 3 is to detect acceleration/deceleration of the wheel speed based on the information on the wheel to output information on the deceleration of the wheel. The vehicle speed calculation means 4 is to calculate vehicle speed based on the information on the wheel speed to output information on the vehicle speed. The slip ratio calculation means 5 is to calculate slip ratio based on the information on the vehicle speed and the information on the wheel speed and to output information on the slip ratio. The vehicle deceleration detecting means 6 is to detect deceleration of the vehicle and to output information on the vehicle deceleration.

The decreasing amount calculation means 7 is to receive the information on the wheel deceleration and the information on the slip ratio. When the decreasing amount calculation means 7 detects that the wheel deceleration or the slip ratio exceeds a given value, the decreasing amount calculation means 7 outputs a signal indicative of a decrease in the braking force to the braking force adjusting means 1.

The maximum acceleration detecting means 8 is to detect the maximum acceleration of the wheel based on the information on the vehicle deceleration to output the results of the detection to the increasing amount calculation means 9.

The increasing amount calculation means 9 is to receive the information on the vehicle deceleration, the information on the slip ratio and the information on the maximum acceleration of the wheel. At the time when the slip ratio reaches a given value or less, the increasing amount calculation means 9 calculates a control amount based on the relationship between the information on the maximum acceleration and information on the vehicle deceleration, thereby to output a signal indicative of a required increase in the braking force to the braking force adjusting means 1.

Next, the embodiment will be explained in more detail with reference to FIG. 2.

Figures 2A, 2B:
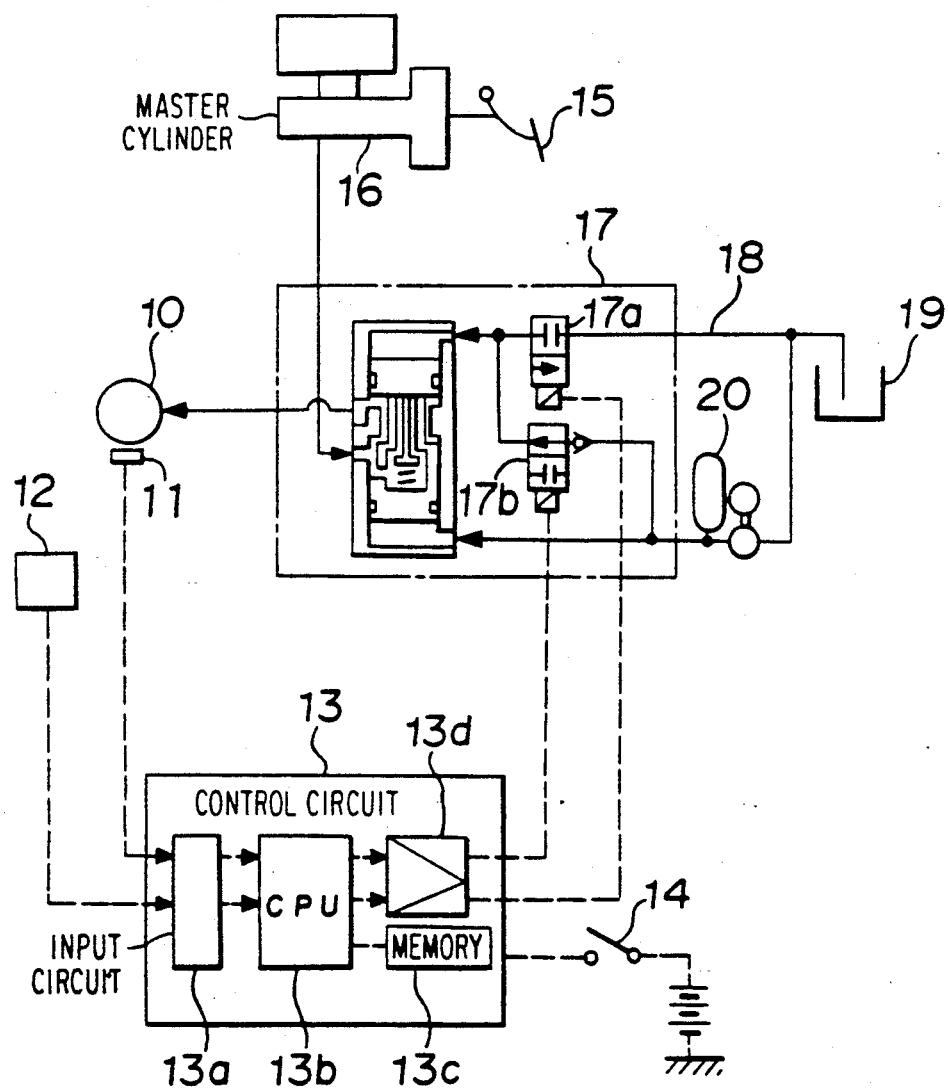
FIG. 2(a) is a block diagram showing a specific structure of the embodiment.
FIG. 2(b) is an enlarged sectional view of the braking force adjusting actuator shown in FIG. 2(a)

FIG. 2(a) is a block diagram showing the structure of the specific embodiment. Explanation on only one wheel will be made for the sake of simplicity.

In FIG. 2(a), reference numeral 10 designates a wheel brake. Reference numeral 11 designates a wheel speed sensor which is arranged to detect the wheel speed. Reference numeral 12 designates a G sensor (acceleration sensor) which detects acceleration/deceleration of the vehicle, and which can be constituted by a differential transformer. Reference numeral 13 designates a control circuit which is provided with power by a power source switch 14, which receives at its input circuit 13a signals from the wheel speed sensor 11 and the G sensor 12, and whose central processing unit using a microcomputer 13b operates in accordance with an instruction program stored in a memory 13c and outputs the results of the operation to its output circuit 13d.

The braking force is transmitted to the wheel brake through a master cylinder 16 and through a braking force adjusting actuator 17 when a driver presses a brake pedal 15 under normal conditions. The operation which is made under antiskid conditions will be described in detail in reference to FIG. 2(b) which is an enlarged view of the braking force adjusting actuator 17.

In FIG. 2(b), the pressure in a chamber 17c and the pressure in a chamber 17d of the actuator 17 are kept at the same level under normal conditions, and a cutvalve 17e of the actuator is therefore pushed by a piston 17f of the actuator to be opened.

When a signal indicative of a decrease in the braking force is outputted from the control circuit 13, a solenoid valve 17a for pressure-decreasing operation and a solenoid valve 17b for pressure-holding operation are both operated to release the pressure in the chamber 17c to a reserver 19 through a conduit 18.

As a result, the piston 17f is shifted upward in FIG. 2(b) to close the cutvalve 17e, causing the communication between the master pressure and the wheel pressure to be cut off, and the volume in the chamber 17g to expand. Thus, the braking force is decreased.

When the control circuit 13 outputs a signal indicative of holding the pressure, the solenoid valve 17a for pressure-decreasing operation is made inoperative while only the solenoid valve 17b for pressure-holding operation is operated. As a result, the movement of the piston 17f is stopped to hold the braking force.

When the control circuit 13 outputs a signal indicative of an increase in pressure, both the solenoid valve 17a and the solenoid valve 17b are made inoperative, causing a pressure to enter the chamber 17c by the combination of a pump motor and an accumulator 20 as a power source, the pump motor and the accumulator maintaining a high pressure. Thus, the piston 17f is shifted downward in FIG. 2(b) to decrease the volume in the chamber 17g, causing the braking force to be increased.

As explained, the system according to the present invention has such a function that the operations of decreasing the pressure, holding the pressure and increasing the pressure are repeated in accordance with commands from the control circuit 13 to adjust the braking force, thereby preventing the wheel from locking.

Figure 3:
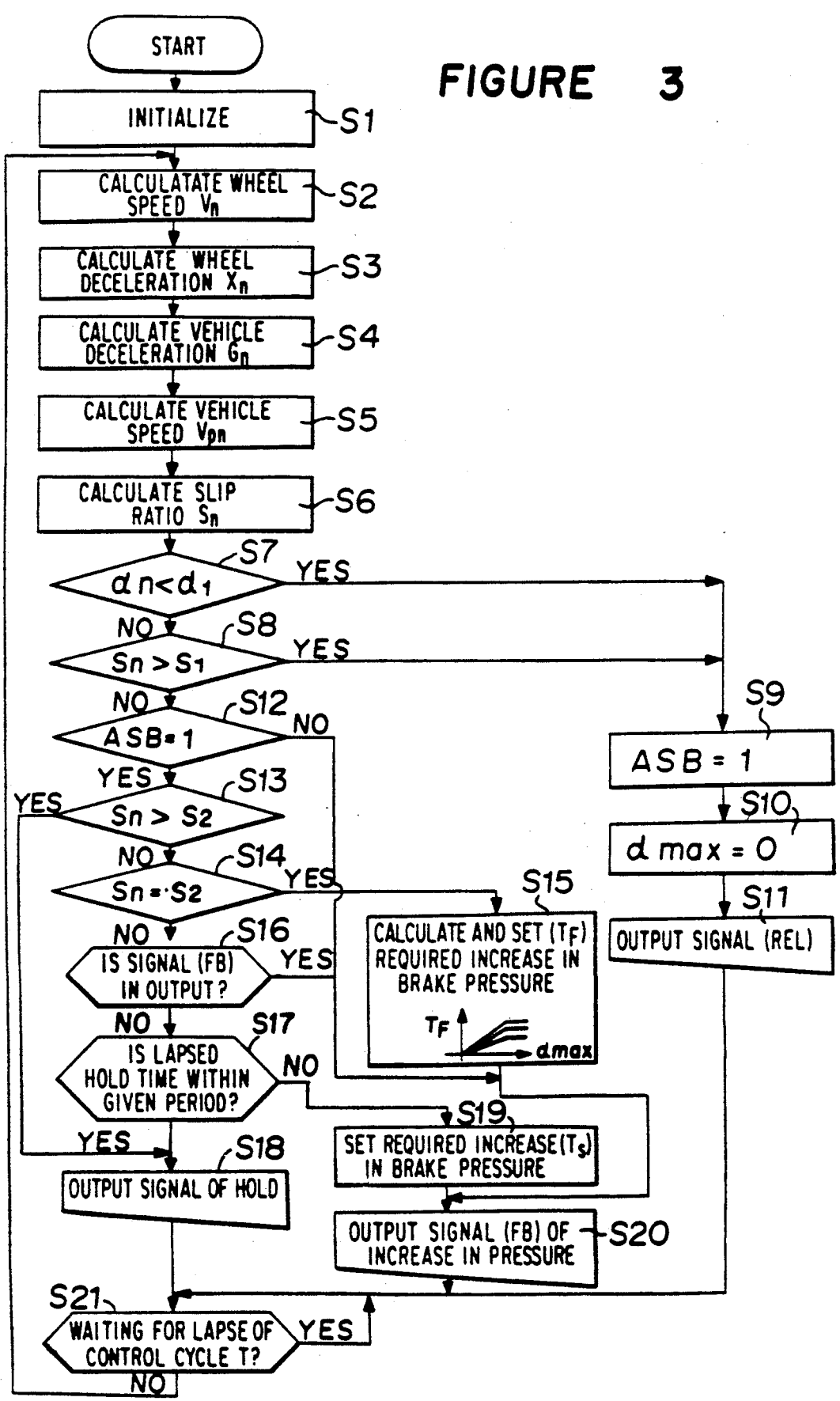
FIG. 3 is a flow chart showing the operation of a microcomputer incorporated in the control circuit shown in FIG. 2(a)

Next, the operation of the microcomputer 13b in the control circuit 13 will be explained in reference to the flow chart of FIG. 3.

When the operation of the microcomputer starts, RAMS and others are initialized at a step S1, and the wheel speed $V_n$ is calculated at a step S2. For the calculation method used to find the wheel speed $V_n$, a periodic measurement can be applied. In the periodic measurement, the wheel speed $V_n$ is found based on the number $P_n$ of the pulses corresponding to the wheel speed $V_n$ which have been inputted during a certain period, the time $t1$ when the first pulse is inputted after the measurement started, and the time $t_n$ when the final pulse is inputted, in accordance with the following expression wherein K is a constant:

$$V_n = K \frac{P_n - 1}{t_n - t1} \tag{1}$$

Next, the wheel deceleration $a_n$ is calculated at a step S3. In the calculation of the wheel deceleration, the wheel deceleration is found based on the control cycle T of the microcomputer 13b, the wheel speed $V_{n-1}$ in the preceding control cycle, and the wheel speed $V_n$ in the present control cycle, in accordance with the following expression:

$$a_n = L \frac{(V_n - V_{n-1})}{T} \quad (2)$$

For the expression, the inequality, $a_n<0$, means deceleration, the inequality, $a_n>0$, means acceleration. L is a constant. When the inequality, $a_n>0$, is obtained, the value of $a_n$ is stored in the memory. If a value which is greater than the stored value is obtained, the greater value is stored in the memory as $a_{max}$.

At the next step S4, the vehicle deceleration $G_n$ is inputted.

At the next step S5, the vehicle speed $V_{pn}$ is calculated. In the calculation step, the value which is obtained by decreasing the wheel speed $V_{pn}$ in the preceding control cycle at a predetermined rate, and the value of the wheel speed $V_n$ in the present control cycle are compared, and a greater value is chosen to find the vehicle speed.

The predetermined rate can be modified depending on the vehicle deceleration or the output conditions of the control signals.

At the next step S6, the following expression is used to find the slip ratio $S_n$:

$$S_n = \frac{(V_{pn} - V_n)}{V_{pn}} \quad (3)$$

At the next step S7, it is checked whether the wheel deceleration $a_n$ is smaller than a given value $a_1$. If $a_n \geq a_1$, it is checked at the next step S8 whether the slip ratio $S_n$ is greater than a given value $S_1$.

If $a_n<a_1$ at the step S7, or $S_n>S_1$ at the step S8, a flag ASB which indicates that it should be under antiskid control is set at a step S9.

The flag ASB is reset at the completion of the antiskid control, i.e., when the vehicle speed has lowered to a predetermined value or less, or depending on the number of the pressure increasing operations (not shown).

At a step S10, the value $a_{max}$ stored at the step S3 is reset.

At the next step S11, a signal (REL) indicative of a decrease in the pressure for the braking force is outputted.

On the other hand, at a step S12, it is checked whether it is under the antiskid control or not. If positive, it is checked at a step S13 whether the slip ratio $S_n$ is greater than a given value $S_2$ ($S_2<S_1$).

At the next step S14, it is checked whether the slip ratio $S_n$ is equal to $S_2$ or not. If affirmative, a required increasing amount in the pressure is calculated at a step S15. The calculation manner will be explained later on.

On the other hand, if the slip ratio $S_n$ is smaller than $S_2$, it is checked at a step S16 whether a signal (FB) indicative of an increase in the pressure for the braking force is outputted or not.

If negative, it is checked at a step S17 whether the hold time wherein the braking force is held constant is counted or not. Unless the hold time $T_H$ has continued for a given time, a signal (HOLD) indicative of holding the braking force is outputted at a step S18.

On the other hand, if the hold time has continued for the given time, a required increasing amount $T_S$ in the pressure for a given time is set at a step S19, and a signal (FB) indicative of increasing the pressure is outputted at a step S20.

At a step S21, the lapse of the control cycle T of the microcomputer 13b is awaited. When the control cycle T has passed, the process returns to the step S2, and then the steps subsequent to the step S2 will be repeated.

At the step S15, the required increasing amount $T_F$ can be found by the following expression based on the maximum wheel acceleration $a_{max}$:

$$T_F = M a_{max} \quad (4)$$

In the expression, M is dependent on the vehicle deceleration $G_n$, and the following relations hold:

$$G_n < G_1 \; M = M_1 \quad (5)$$

$$G_1 \leq G_n < G_2 \; M = M_2 \quad (6)$$

$$G_2 < G_n \; M = M_3 \quad (7)$$

wherein there is a relation of $M_1<M_2<M_3$.

It means that the greater the maximum acceleration $a_{max}$, the greater is the required increasing amount $T_F$, and that the greater the vehicle deceleration $G_n$, the greater is the required increasing amount $T_F$.

The increasing amount $T_S$ can be, e.g., a predetermined value, which is different from the increasing amount $T_F$.

Now, an operational example of an actual vehicle will be explained with reference to FIG. 4.

Suppose that the wheel speed has changed with the lapse of time as indicated by 101 in FIG. 4(a). The vehicle speed changes as indicated by 102, and the vehicle speed with slip ratio of x% changes as indicated by 103.

In addition, suppose that the wheel acceleration/deceleration has changed as indicated by 104 in FIG. 4(c), and that the vehicle deceleration has changed as indicated by 106 in FIG. 4(b).

When the maximum acceleration $a_{max1}$, the maximum acceleration $a_{max2}$ and the maximum acceleration $a_{max3}$ are stored, pressure-increasing signals are calculated as indicated by 107 in FIG. 4(d). The calculation of the pressure-increasing signals is made when the vehicle speed 102 and the wheel speed 101 cross. A required pressure-increasing amount $T_F$ is calculated based on $a_{max}$ and the vehicle deceleration G.

Figure 5:
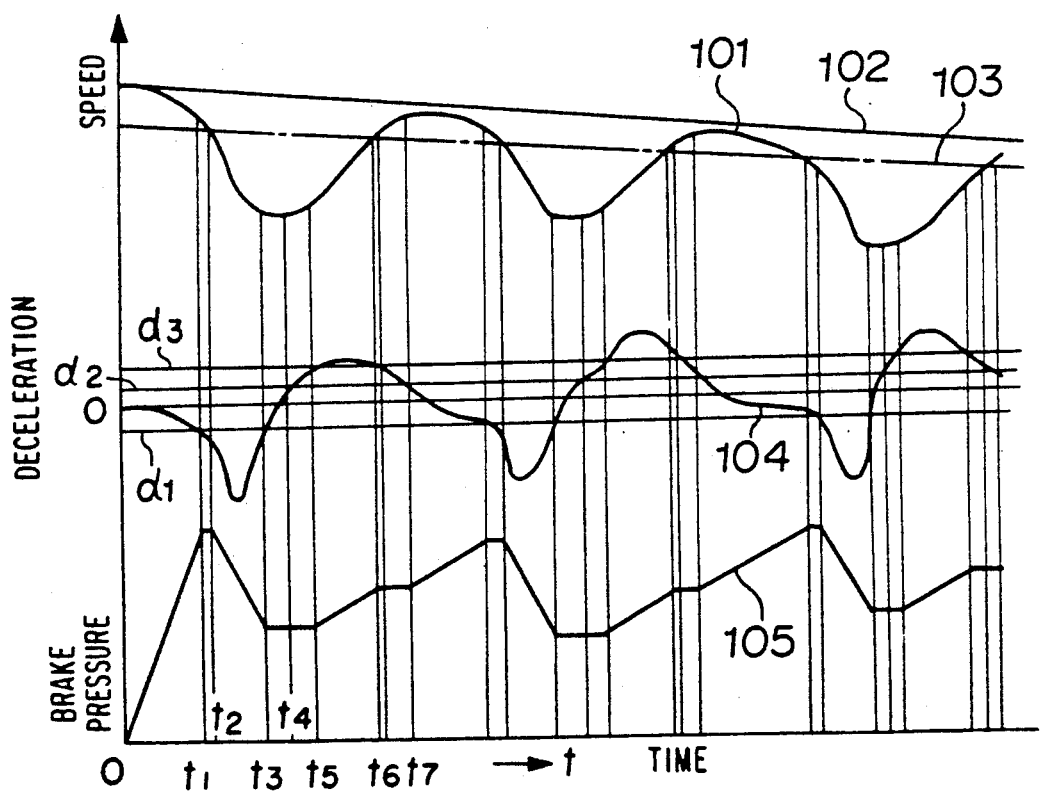
FIG. 5 is a drawings of graphs showing a conventional antiskid manner in a vehicle.

After the pressure increasing signal was inputted, signals $T_S$ indicative of a required increase in the pressure are outputted at every cycle of $T_H$, causing the braking pressure to change as indicated by 105 in FIG. 5(e). This means that after the braking pressure is lowered, the braking pressure is rapidly increased after a time, and then the braking pressure is gradually increased.

Although the embodiment as stated earlier detects the vehicle deceleration in a linear manner, a switching type detector using a G switch such as a mercury switch can be utilized.

In addition, although the embodiment as stated earlier adopts a method wherein the gradual increase in the braking pressure after the rapid increase in the braking pressure is made in two modes of hold and increase, the type wherein the braking pressure is gradually increasing at a certain gain as indicated by 108 in FIG. 4(e) can be adopted.

Obviously, numerous modifications and variations of the present invention are possible in light of the above teachings. It is therefore to be understood that within the scope of the appended claims, the invention may be practiced otherwise than as specifically described herein.

What is claimed is:

1. An antiskid control system comprising:
   wheel speed detecting means for detecting the speed of at least one wheel of a vehicle to output information on the wheel speed;
   braking force adjusting means for decreasing and increasing a braking force to be applied to the wheel in response to at least one of a signal indicative of a decrease in the braking force and a signal indicative of an increase in the braking force;
   wheel deceleration detecting means for detecting acceleration/deceleration of the wheel so as to output information on the deceleration of the wheel;
   vehicle speed calculation means for calculating vehicle speed based on the information on the wheel speed;
   slip ratio calculation means for calculating slip ratio based on the information corresponding on the vehicle speed and the information on the wheel speed to output information on the slip ratio;
   vehicle deceleration detecting means for detecting deceleration of the vehicle to output information on the vehicle deceleration;
   decreasing amount calculation means for receiving the information on the wheel deceleration and the information on the slip ratio, and for outputting said signal indicative of a decrease in the braking force to the braking force adjusting means when detecting a tendency of the wheel to lock wherein at least one of the wheel deceleration and the slip ratio exceeds a given value;
   maximum acceleration detecting means for detecting the maximum acceleration of the wheel based on the information on vehicle deceleration; and
   increasing amount calculation means for receiving the information on the slip ratio, the information on vehicle deceleration and the information on the maximum acceleration, and for finding a control amount based on the relationship between the information on the maximum acceleration and the information on the vehicle deceleration when the slip ratio is less than or equal to a given value, thereby to output said signal indicative of an increase in the braking force to the braking force adjusting means.

2. A method for controlling the braking so as to prevent slippage of a vehicle, said method comprising the steps of:
   (a) detecting the speed of at least one wheel of a vehicle so as to output information on the wheel speed;
   (b) detecting acceleration/deceleration of the wheel so as to output information on the deceleration of the wheel;
   (c) calculating vehicle speed based on the information on the wheel speed;
   (d) calculating slip ratio based on the information corresponding on the vehicle speed and the information on the wheel speed so as to output information on the slip ratio;
   (e) detecting deceleration of the vehicle so as to output information on the vehicle deceleration;
   (f) receiving the information on the wheel deceleration and the information on the slip ratio, and outputting a signal indicative of a decrease in the braking force to the braking force adjusting means when detecting a tendency of the wheel to lock when at least one of the wheel deceleration and the slip ratio exceeds a given value;
   (g) detecting the maximum acceleration of the wheel based on the information on vehicle deceleration;
   (h) receiving the information on the slip ratio, the information on vehicle deceleration and the information on the maximum acceleration, and finding a control amount based on the relationship between the information on the maximum acceleration and the information on the vehicle deceleration when the slip ratio is less than or equal to a given value so as to output a signal indicative of an increase in the braking force to the braking force adjusting means; and
   (i) controlling a braking force adjusting means for at least one of increasing and decreasing a braking force applied to the wheel in response to one of said signal indicative of a decrease in the braking force and said signal indicative of an increase in the braking force.

* * * * *